US008823880B2

(12) United States Patent
Allen et al.

(10) Patent No.: US 8,823,880 B2
(45) Date of Patent: Sep. 2, 2014

(54) REMOTE CONTROL DEVICE WITH INTEGRATED DISPLAY SCREEN FOR CONTROLLING A DIGITAL VIDEO RECORDER

(71) Applicants: Paul Allen, Mercer Island, WA (US); James A. Billmaier, Woodinville, WA (US)

(72) Inventors: Paul Allen, Mercer Island, WA (US); James A. Billmaier, Woodinville, WA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

(21) Appl. No.: 13/664,154

(22) Filed: Oct. 30, 2012

(65) Prior Publication Data

US 2013/0051752 A1    Feb. 28, 2013

Related U.S. Application Data

(63) Continuation of application No. 13/069,021, filed on Mar. 22, 2011, now Pat. No. 8,300,156, and a continuation of application No. 12/234,209, filed on Sep. 19, 2008, now Pat. No. 7,911,543, and a continuation of application No. 09/916,635, filed on Jul. 27, 2001, now Pat. No. 7,428,023.

(60) Provisional application No. 60/285,086, filed on Apr. 19, 2001.

(51) Int. Cl.
*H04N 5/92*    (2006.01)
*H04N 7/14*    (2006.01)
*H04N 5/44*    (2011.01)
*H04N 5/445*    (2011.01)
*H04N 5/85*    (2006.01)

(52) U.S. Cl.
CPC ......... *H04N 5/4403* (2013.01); *H04N 5/44582* (2013.01); *H04N 5/85* (2013.01)
USPC ......... 348/734; 348/552; 348/14.05; 386/248

(58) Field of Classification Search
CPC ....... H04N 5/4403; H04N 5/85; G11B 27/105
USPC ........... 348/734, 552, 14.05; 725/81; 386/248
See application file for complete search history.

(56) References Cited

U.S. PATENT DOCUMENTS

| | | |
|---|---|---|
| 5,410,326 A | 4/1995 | Goldstein et al. |
| 5,671,267 A | 9/1997 | August et al. |
| 5,710,605 A | 1/1998 | Nelson et al. |
| 5,748,725 A | 5/1998 | Kubo et al. |
| 5,889,852 A | 3/1999 | Rosecrans et al. |
| 5,949,474 A | 9/1999 | Gerszberg et al. |
| 5,999,207 A | 12/1999 | Rodriguez et al. |
| 6,020,914 A | 2/2000 | Douhet |
| 6,040,829 A | 3/2000 | Croy et al. |
| 6,097,441 A | 8/2000 | Allport et al. |

(Continued)

OTHER PUBLICATIONS

OmniRemote Remote: http://www.pacificneotek.com/omnisw.htm, pp. 1-2, per web download dated May 31, 2001.

*Primary Examiner* — Jefferey Harold
*Assistant Examiner* — Jean W Desir
(74) *Attorney, Agent, or Firm* — Troy A. Van Aacken

(57) ABSTRACT

A remote control for a digital video recorder includes an integrated display screen configured to display a recording list including programs scheduled to be recorded.

16 Claims, 6 Drawing Sheets

(56) References Cited

U.S. PATENT DOCUMENTS

| | | | |
|---|---|---|---|
| 6,104,334 A | 8/2000 | Allport et al. | |
| 6,124,882 A | 9/2000 | Voois et al. | |
| 6,127,941 A | 10/2000 | Van Ryzin et al. | |
| 6,128,033 A | 10/2000 | Friedel et al. | |
| 6,130,726 A | 10/2000 | Darbee et al. | |
| 6,181,326 B1 | 1/2001 | Takahashi | |
| 6,240,303 B1 | 5/2001 | Katzur | |
| 6,246,441 B1 * | 6/2001 | Terakado et al. | 348/552 |
| 6,278,499 B1 | 8/2001 | Darbee et al. | |
| 6,292,283 B1 | 9/2001 | Grandbois | |
| 6,339,842 B1 | 1/2002 | Fernandez et al. | |
| 6,397,388 B1 | 5/2002 | Allen | |
| 6,442,251 B1 | 8/2002 | Maes et al. | |
| 6,442,272 B1 | 8/2002 | Osovets | |
| 6,442,328 B1 * | 8/2002 | Elliott et al. | 386/230 |
| 6,453,115 B1 | 9/2002 | Boyle | |
| 6,483,986 B1 | 11/2002 | Krapf | |
| 6,509,908 B1 | 1/2003 | Croy et al. | |
| 6,529,233 B1 | 3/2003 | Allen | |
| 6,532,592 B1 | 3/2003 | Shintani et al. | |
| 6,532,593 B1 | 3/2003 | Moroney | |
| 6,772,436 B1 | 8/2004 | Doganata et al. | |
| 6,832,083 B1 | 12/2004 | Oba et al. | |
| 6,862,741 B1 | 3/2005 | Grooters | |
| 6,879,351 B1 | 4/2005 | Brown | |
| 6,931,123 B1 | 8/2005 | Hughes | |
| 6,944,880 B1 | 9/2005 | Allen | |
| 7,058,356 B2 | 6/2006 | Slotznick | |
| 7,428,023 B2 | 9/2008 | Allen et al. | |
| 7,911,543 B2 | 3/2011 | Allen et al. | |
| 2001/0055951 A1 | 12/2001 | Slotznick | |
| 2001/0056350 A1 | 12/2001 | Calderone et al. | |

* cited by examiner

REMOTE CONTROL DEVICE WITH INTEGRATED DISPLAY SCREEN FOR CONTROLLING A DIGITAL VIDEO RECORDER

CROSS-REFERENCE TO RELATED U.S. APPLICATIONS

This application is a continuation of U.S. patent application Ser. No. 13/069,021, entitled "Remote Control Device with Integrated Display Screen for Controlling a Digital Video Recorder," filed Mar. 22, 2011, and is a continuation of U.S. patent application Ser. No. 12/234,209, entitled "Remote Control Device with Integrated Display Screen for Controlling a Digital Video Recorder," filed Sep. 19, 2008 (issued as U.S. Pat. No. 7,911,543 on Mar. 22, 2011), and is a continuation of U.S. patent application Ser. No. 09/916,635, entitled "Remote Control Device with Integrated Display Screen for Controlling a Digital Video Recorder," filed Jul. 27, 2001 (issued as U.S. Pat. No. 7,428,023 on Sep. 23, 2008), and is a non-provisional of U.S. Provisional Application No. 60/285,086, entitled "Multifunction Display Screen for a Hybrid Communicator/Remote Control," filed on Apr. 19, 2001 (now expired), each of which are hereby incorporated by reference in their entirety.

TECHNICAL FIELD

The present invention relates generally to the field of digital video recording. More specifically, the present invention relates to a remote control device with an integrated display screen for controlling a digital video recorder.

DESCRIPTION OF RELATED BACKGROUND ART

Traditionally, video cassette recorders (VCRs) have been used to record television programs on inexpensive video tapes for time-shifting purposes, i.e. for recording and playing back television programs at more convenient times. Today, however, VCRs are being replaced by digital video recorders (DVRs), which digitally record television programs within mass storage devices, such as hard disk drives. DVRs are superior to VCRs in that no video tapes are required. Moreover, DVRs often provide a higher recording quality and are easier to use than VCRs.

A DVR typically displays a user interface (UI) on an attached television for viewing available programming, selecting programs to record, managing recording selections, etc. For instance, the UI typically provides an electronic program guide (EPG), which is an on-screen listing of available television programs for recording by the DVR. Often, the EPG may be used to interactively select programs to be recorded.

Unfortunately, conventional DVR UIs have a number of problems. For example, many such UIs tend to occupy a substantial portion of the television screen, or even the entire screen, so that a viewer cannot simultaneously view television programs and look at an EPG listing or make recording selections. This is especially problematic when a group of viewers are watching television, some of whom are intensely interested in the currently displayed program, while others wish to see what other programs are available.

Consequently, there is a need for a DVR UI that allows a user to view programming options, make recording selections, and the like, without interfering with or obscuring the television program being currently displayed.

BRIEF DESCRIPTION OF THE DRAWINGS

Non-exhaustive embodiments of the invention are described with reference to the figures, in which.

DETAILED DESCRIPTION

Figure 1:
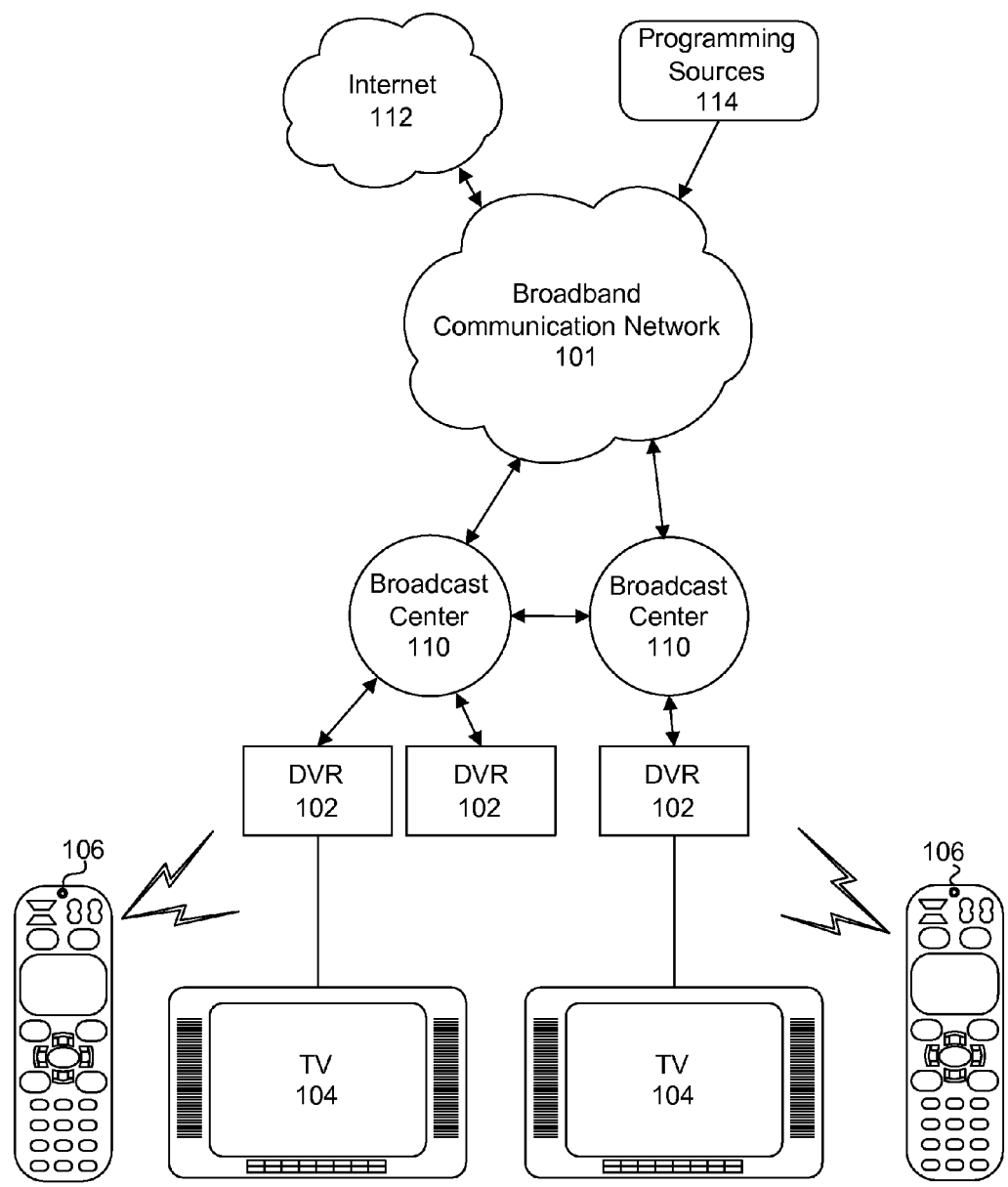
FIG. 1 is a schematic block diagram of a system for broadcasting television programs to a number of digital video recorders (DVRs)

The present invention solves the foregoing problems and disadvantages with a system and method for providing programming information and control for a digital video recorder (DVR) using a remote control with an integrated display screen. In certain embodiments, the DVR may be integrated with a set top box (STB) for cable or satellite delivery system. Alternatively, the DVR may work with a separate STB to receive television programming.

In one embodiment, the display screen of the remote control is used to display a user interface (UI) for the DVR. The UI may include an electronic program guide (EPG), which displays a listing of available programs to be recorded by the DVR. In certain embodiments, the EPG may allow a user to interactively select programs to be recorded by the DVR.

The UI may also display a list of programs scheduled to be recorded (e.g., a recording list), a list of programs successfully recorded and available for playback (e.g., a play list), and various menus and controls for operating and configuring a DVR.

Because the UI of the present invention is shown on the display screen of the remote control rather than the television screen, a user may watch a television program while simultaneously viewing programming choices, selecting programs to record, managing recording tasks, changing DVR settings, etc.

While the following specification makes particular reference to video recording, those skilled in the art will recognize that audio programs, such as Internet radio, DMX music, and the like, may be similarly recorded using the techniques disclosed herein. Thus, a digital video recorder, as contemplated herein, may record various types of audio and video media. Moreover, "television programs" may be read more generally to encompass various types of audio-only and audio/video content, such as streaming audio/video, video-on-demand (VoD), pay-per-view (PPV), audio book channels, non-video music channels, etc.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Throughout the following disclosure, the term "coupled" may be used to refer to components that are either directly connected to one another or linked by one or more other components. Thus, as used herein, the term "coupled" may be synonymous with "in electrical communication with" or simply "in communication with."

Referring now to FIG. 1, there is shown a system 100 for broadcasting television programs via a broadband communication network 101 to a plurality of digital video recorders (DVRs) 102. The network 101 may be embodied, for example, as a cable television network or a direct broadcast satellite (DBS) network, although other networks are within the scope of the invention.

A DVR 102 is a device that is cable of receiving and digitally recording television programs and other audio/video content. Typically, a DVR 102 includes a mass storage device, such as a hard disk drive, for storage. A DVR 102 is also capable of playing back stored programs on an attached display device, such as a television 104.

In some instances, a DVR 102 may be integrated with a set top box (STB) for decoding content received from the network 101. For example, the DirecTivo® product of Phillips Electronics combines satellite (DirectTV®) reception with digital video recording. Of course, the DVR 102 disclosed herein differs from conventional DVRs in several respects, as described in greater detail below. In alternative embodiments, a DVR 102 may work with a separate STB to receive decoded programming.

Each DVR 102 may have an associated remote control 106 that provides convenient remote operation of the DVR 102. The remote control 106 may use infrared (IR), radio frequency (RF), or other wireless technologies to transmit control signals to the DVR 102, and optionally to the television 104.

In one embodiment, DVRs 102 are linked to the network 101 via a broadcast center 110. In the context of a cable network, the broadcast center 110 may take the form of a head-end. A head-end is generally a centrally-located facility within a community where cable television programming is received from a satellite downlink or other source and packaged together for cable transmission to customer homes.

The broadcast center 110 may also be embodied as a satellite broadcast center within a DBS system. A DBS system may utilize a small 18-inch satellite dish (which is an antenna for receiving a satellite broadcast signal). Each DVR 102 may be integrated with a digital integrated receiver/decoder (IRD), which separates each channel, and decompresses and translates the digital signal from the satellite dish so that the television 104 can show the digital signal. The remote control 106 may then be used to control the IRD with the integrated DVR 102, and optionally the television 104.

Programming for a DBS system may be distributed, for example, by multiple high-power satellites in geosynchronous orbit, each with multiple transponders. Compression (e.g., MPEG) is used to increase the amount of programming that can be transmitted in the available bandwidth.

The broadcast centers 110 may be used to gather programming content, ensure its digital quality, and transmit the signal up to the satellites. Programming may come to the broadcast centers 110 from content providers (CNN, ESPN, HBO, TBS, etc.) via satellite, fiber optic cable and/or special digital tape. Satellite-delivered programming is typically immediately digitized, encrypted and uplinked to the orbiting satellites. The satellites retransmit the signal back down to every earthstation, e.g., every compatible DBS system receiver dish at customers' homes and businesses.

Some programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

The network 101 is preferably coupled to one or more television programming sources 114, which provide television programs for distribution to the DVRs 102. In one configuration, television programs are distributed in an encoded format, such as MPEG (Moving Picture Experts Group). Various MPEG formats are known, such as MPEG-2, MPEG-4, MPEG-7, and the like. Thus, the term "MPEG," as used herein, contemplates all MPEG formats. Moreover, other video encoding and compression standards exist other than MPEG, such as JPEG, JPEG-LS, H.261, and H.263 and are contemplated herein. Accordingly, the invention should not be construed as being limited only to MPEG.

Figure 2:
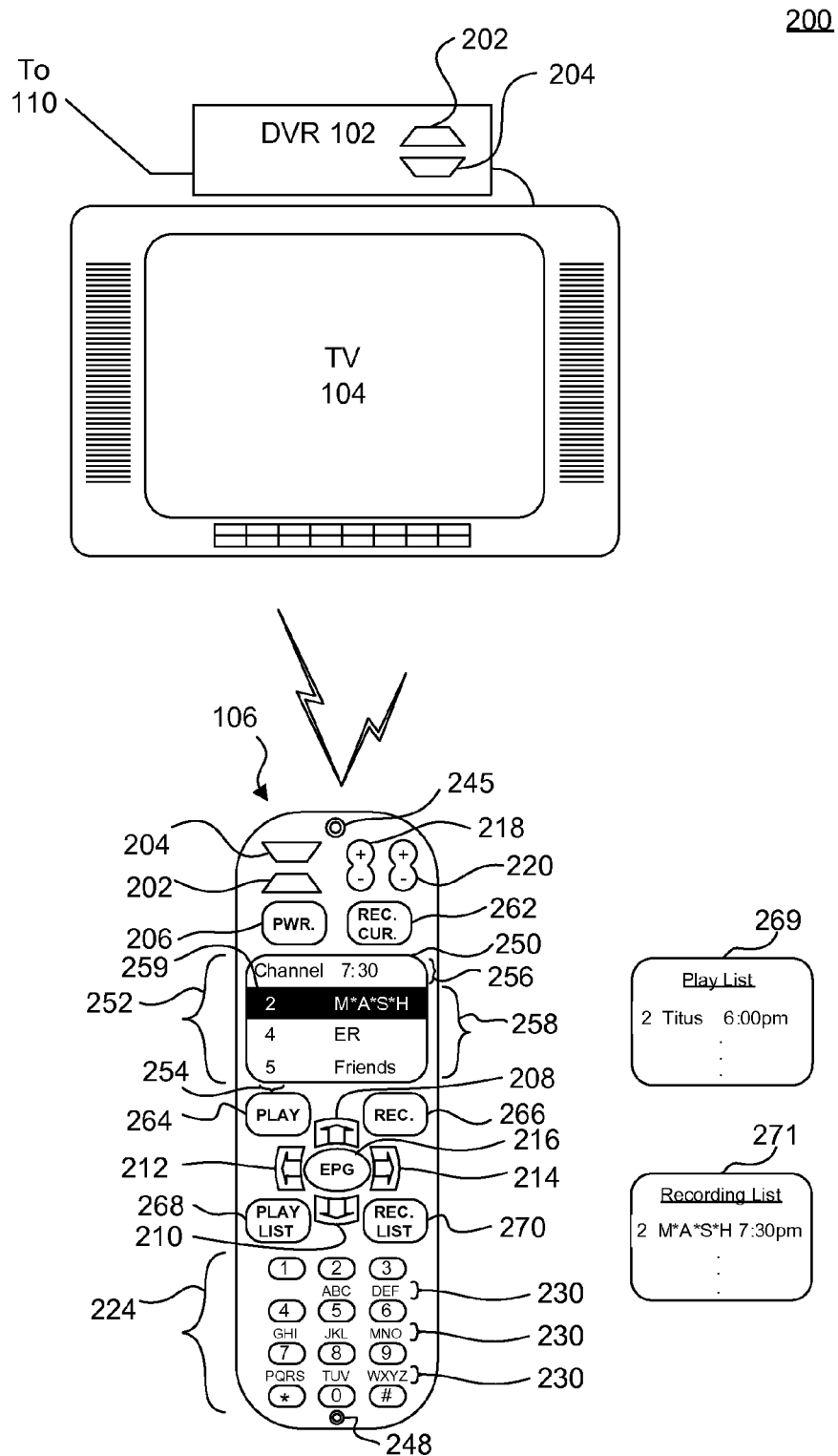
FIG. 2 is an illustration of a remote control for a DVR including an integrated display screen.

Referring now to FIG. 2, there is shown an interactive television system 200 according to an embodiment of the invention. As depicted, the system 200 may include a DVR 102, a television 104 (or other display device), and a remote control 106.

The remote control 106 is provided for convenient remote operation of the DVR 102 and optionally, of the television 104. In one configuration, the remote control 106 includes a wireless transmitter 202 for communicating with a corresponding wireless receiver 204 within the DVR 102. Likewise, the remote control 106 includes a wireless receiver 204 for receiving signals from a wireless transmitter 202 within the DVR 102. In one embodiment, the wireless transmitters 202 and receivers 204 are configured to use radio frequency (RF) signals. In other embodiments, infrared (IR) or other frequencies along the electromagnetic spectrum may be used. The wireless transmitter 202 and wireless receiver 204 may operate according to the IEEE 802.11a or 802.11b Wireless Networking standards, the "Bluetooth" standard, the IrDA standard, etc. Moreover, the wireless transmitter 202 and wireless receiver 204 may include various additional components not specifically illustrated but well known in the art, such as a non-directional antenna. The antenna may comprise a substantially two-dimensional metal structure formed on a printed circuit board for the remote control 106.

The remote control 106 preferably includes a number of buttons or other similar controls for receiving user commands. For instance, the remote control 106 may include a power button 206, an up arrow button 208, a down arrow button 210, a left arrow button 212, a right arrow button 214, an "EPG" button 216, channel adjustment buttons 218, volume adjustment buttons 220, and alphanumeric buttons 224. Each of the alphanumeric buttons 224 may be associated with a set of alphabet characters 230 for entering text into the remote control 106 without an external keyboard.

In one embodiment, the remote control 106 includes a display screen 250. The display screen 250 may be of any suitable type, including a liquid crystal display (LCD), liquid plasma display, or organic electroluminescent (OEL) display. If desired, the display screen 250 may be backlit for enhanced picture quality and viewing in a dark environment. Additionally, the display screen 250 may be color or monochromatic in various embodiments.

The display screen 250 may also be configured as a touch screen capable of sensing user contact. If a touch screen 250 is used, "soft buttons" may be displayed on the screen 250 so that a user may simply press the designated portion of the screen 250 to initiate a command. Such a screen 250 may make one or more of the buttons 208-224 unnecessary.

Alternatively, the screen 250 may be configured to display "soft menus," or selections that cannot be directly activated using the screen 250, but can be easily correlated to physical buttons of the remote control 106. Thus, several selections may correspond to relatively few physical buttons, and one or more of the buttons 208-224 may again be unnecessary.

In one implementation, the display screen 250 is used to display a user interface (UI) for controlling the DVR 102. Traditionally, such a UI is displayed on the television 104, although the television program being viewed either is partially or wholly obscured by the UI.

The UI may include electronic program guide (EPG) 252, which lists available television programs capable of being received and recorded by the DVR 102. The EPG 252 may be displayed in response to user activation of the "EPG" button 216 or other suitable control.

In one embodiment, the EPG 252 is displayed in a grid or columnar format including a first axis corresponding to channels 254, a second axis corresponding to time slots 256, and a plurality of selectable elements corresponding to television programs 258. The EPG 252 may be configured to simultaneously display available programs 258 corresponding to one or more channels 254 and/or one or more time slots 256. In one embodiment, the navigation buttons 208-214 may be used to scroll the EPG 252 horizontally or vertically to reveal additional channels 254 and/or time slots 256.

An indicator 259 such as reverse video, highlighting, underlining, color differentiation, graphical icon, or the like, may be used to indicate which of the television programs 258 is currently selected. The user may thus utilize the navigation buttons 208-214, the alphanumeric buttons 224, direct contact with the screen 250, or the like, to move the indicator 259 to designate a selected television program 258, e.g., "M*A*S*H" in FIG. 2.

The remote control 106 may also include a "record current" button 262, a "play selection" button 264, and a "record selection" button 266. The "record current" button 262 may be used to record a television program currently being displayed on the TV 104. The "play selection" button 264 may be used to play the selected television program 258 if previously recorded or in progress. Similarly, the "record selection" button 266 may be used to record the selected television program 258 when it is broadcast.

Additionally, the remote control 106 may have a "play list" button 268 and a "recording list" button 270. The "play list" button 268 may be used to display a play list 269 on the display screen 250, or a list of television programs 258 that have been successfully recorded and are ready for playback. In certain configurations, as shown in FIG. 2, the play list 269 may indicate the name, channel, and starting time for each recorded television program 258.

The "recording list" button 270 may similarly be used to display a recording list 271, or a list of television programs 258 that have been scheduled for recording. Like the play list 269, the recording list 271 may indicate the name, channel, and starting time for each recorded television program 258.

Figure 3:
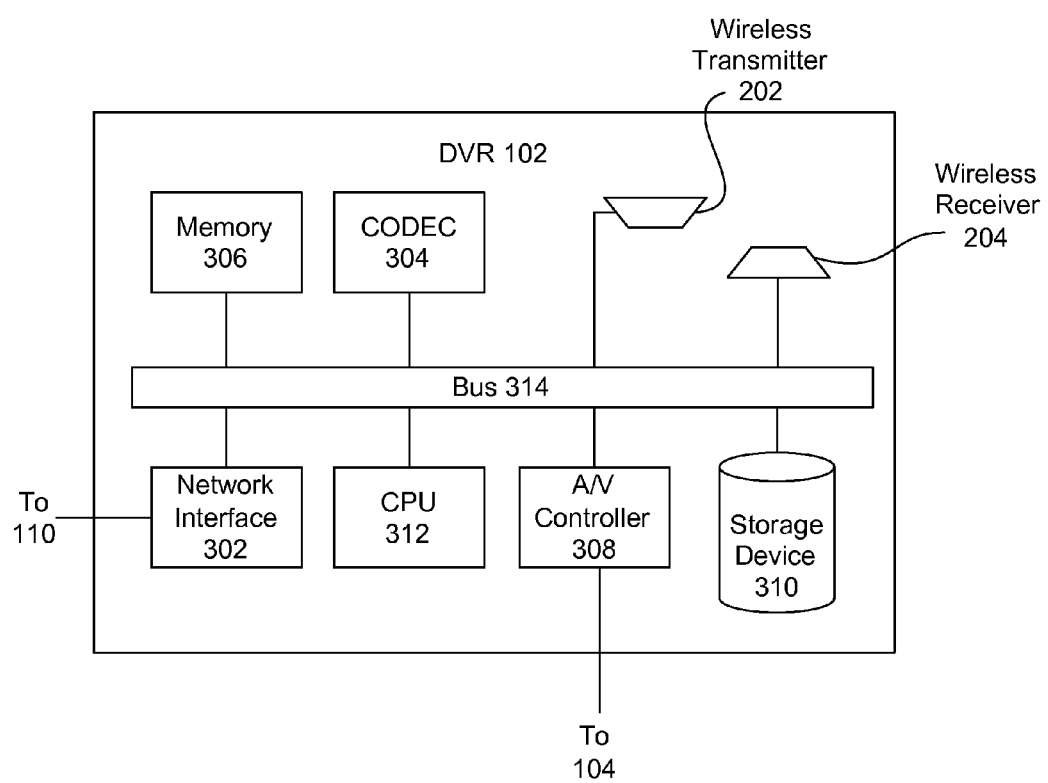
FIG. 3 is a schematic block diagram of physical components of one embodiment of a DVR.

Referring now to FIG. 3, there is shown a physical block diagram of a DVR 102 according to an embodiment of the invention. As noted above, the DVR 102 includes a wireless receiver 204 for receiving control signals from the wireless transmitter 202 in the remote control 106. Additionally, the DVR 102 includes a wireless transmitter 202 for transmitting information to the wireless receiver 204 of the remote control 106.

The DVR 102 also includes, in one implementation, a network interface 302 for communicating with the broadband communication network 101 via a broadcast center 110. The interface 302 may include conventional tuning, demodulating, and demultiplexing circuitry for receiving MPEG (Moving Picture Experts Group) packets corresponding to a selected MPEG channel.

If the DVR 102 communicates with a cable head-end, the interface 302 may conform to the DOCSIS (Data Over Cable Service Interface Specification) or DAVIC (Digital Audio-Visual Council) cable modem standards. If the DVR 102 communicates with a satellite broadcast center, suitable equipment may be provided for satellite communication.

One or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

In one embodiment, the DVR 102 includes a codec (encoder/decoder) 304. The codec 304 may be used to decode television programs received from the network 101. The codec 304 may also be used to encode television programs for storage in the storage device 310. The codec 304 may use MPEG encoding/decoding or other algorithms. While the codec 304 is illustrated as a hardware component, software encoding/decoding is also contemplated.

The DVR 102 further includes a memory device 306, such as a random access memory (RAM), configured to store data for temporary use. Similarly, a read-only memory (ROM) may be provided for storing more permanent data, such as fixed code and configuration information.

In one embodiment, an audio/video (N/V) controller 308 is provided for converting decoded audio/video information into analog signals for display/playback on the television 104 or other device. The N/V controller 308 may be implemented using one or more physical devices, such as separate graphics and sound controllers.

The DVR 102 also includes a storage device 310 configured to store digitally encoded television broadcasts, which may be subsequently retrieved, decoded, and displayed using the codec 304 and the A/V controller 308, respectively. The storage device 310 may also be used in various embodiments to store viewer preferences, parental lock settings, electronic program guide (EPG) data, programming preferences, passwords, e-mail messages, and the like. In one implementation, the storage device 310 also stores an operating system (OS) for the DVR 102, such as Windows CE® or Linux®. The storage device 310 may be implemented using any standard mass storage device, such as a hard disk drive.

A CPU 312 may control the operation of the DVR 102, including the other components thereof, which are coupled to the CPU 312 via a bus 314. The CPU 312 may be embodied as a microprocessor, a microcontroller, a digital signal processor (DSP) or other device known in the art. As noted above, the CPU 312 may perform logical and arithmetic operations based upon control signals generated by the remote control 106 and transmitted to the receiver 204. Alternatively, the CPU 312 may respond to control signals received through the network interface 302.

Of course, FIG. 3 illustrates only one possible configuration of a DVR 102. Those skilled in the art will recognize that various other architectures and components may be provided within the scope of the invention. In addition, various standard components are not illustrated in order to avoid obscuring aspects of the invention.

Figure 4:
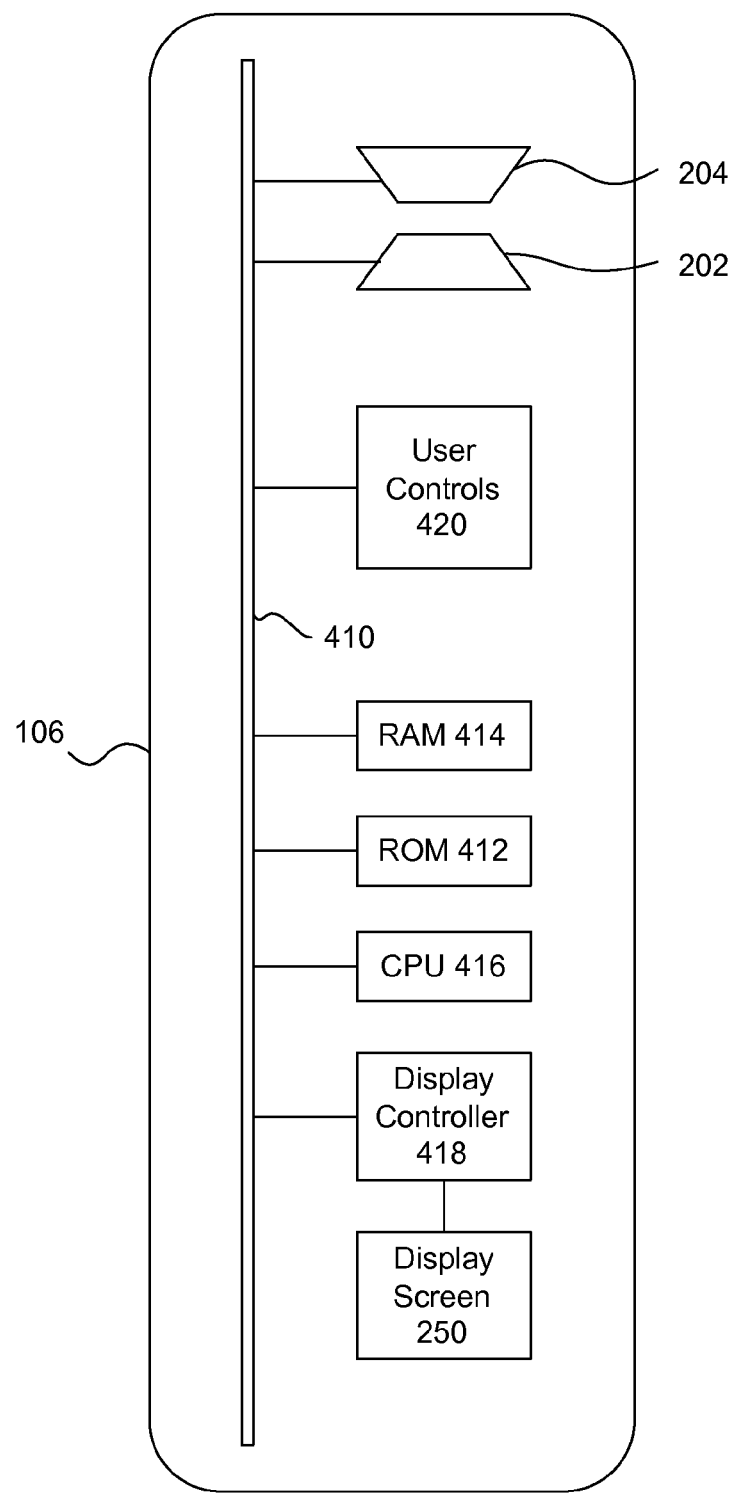
FIG. 4 is a schematic block diagram of physical components of a remote control for a DVR including an integrated display screen.

Referring to FIG. 4, a schematic block diagram illustrates physical components of a remote control 106 according to one embodiment of the invention. The remote control 106 may include a bus 410 configured to transfer digital signals between the various components of the remote control 106.

The remote control 106 may also include a read-only memory (ROM) 412 that contains data to be permanently stored within the remote control 106. For example, the ROM 412 may contain an operating system (OS) to control the operation of the remote control 106. The OS may be of a commonly available type, such as Windows CE® or Linux®. The ROM 412 may take the form of one or more programmable read-only memory (PROM) modules, electrically-erasable PROM (EEPROM) modules, or the like.

Additionally, the remote control 106 preferably includes a random access memory (RAM) 414 for storing temporary data. The RAM 414 may store data, for example, for the EPG 252, the play list 269, recording list 271, user preferences, and/or other information relevant to the operation of the remote control 106.

Additionally, a CPU 416 may be provided to execute software instructions within the RAM 414 and/or the ROM 412. The CPU 416 may be of any known type, such as a standard microprocessor, microcontroller, digital signal processor (DSP), reduced instruction set computing (RISC) processor, field programmable gate array (FPGA), or application-specific integrated circuit (ASIC).

A display controller 418 may be provided to control the operation of the display screen 250. As such, the display controller 418 may include graphics hardware capable of transforming a display signal into a signal usable by the display screen 250 to produce a visual output. The display controller 418 may be adapted to provide a monochromatic or color picture, as desired.

The remote control 106 may also have user controls 420, which include the buttons 206-224, 262-270 described above. The user controls 420 of the remote control 106 may also include additional buttons, sliders, switches, touch pads, shuttles, or other devices that may facilitate user operation of the remote control 106. Other components such as a power supply, backlight for the user controls 420, or the like may also be included, as known in the art. Operation of the various components of the remote control 106 and the DVR 102 will be described in greater detail in conjunction with FIGS. 5 and 6.

Figure 5:
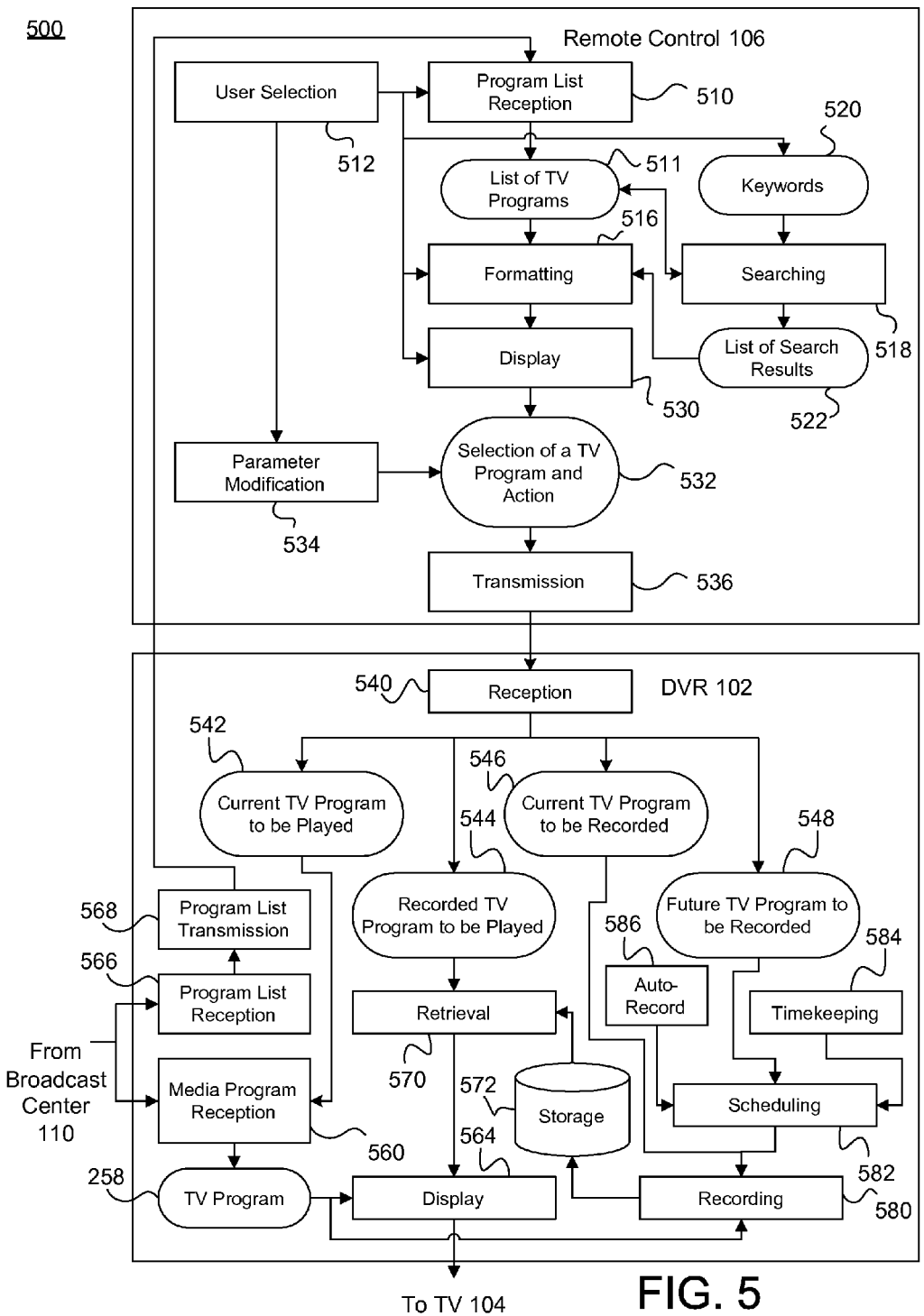
FIG. 5 is a schematic block diagram of logical components of a system for digital recording and playback using a remote control with an integrated display screen.

FIG. 5 illustrates logical components of a system 500 for providing programming information and control of the DVR 102 via a remote control 106 with an integrated display screen 250. The depicted logical components may be implemented using one or more of the physical components shown in FIG. 3 and FIG. 4. Thus, while certain components may be depicted within the remote control 106, similar components may be embodied within the DVR 102 in other embodiments. Likewise, components illustrated within the DVR 102 may be embodied, in certain embodiments, within the remote control 106. Of course, various logical components may be implemented as software, hardware, or firmware.

In one implementation, the system 500 includes a program list reception component 510 configured to receive a list 511 of television programs 258. The list 511 may contain programs scheduled for broadcast at or near the current time (e.g., an EPG 252 listing). In the alternative, the list 511 of television programs 258 may be a play list 269 including television programs 258 that have been stored by the DVR 102, or a recording list 271 including television programs 258 that have been scheduled for recording.

In any case, the program list reception component 510 may receive the list 511 from the DVR 102. The list 511, which may include channels, times, program names, program descriptions, credits, and/or other program characteristics, may be then stored in the RAM 414 or other memory device, through the use of various data structures such as an array, linked list, or other suitable data structure.

A user selection component 512 may determine the type of program list 511 to be received. For example, a user may press the "EPG" button 216, the "play list" button 268, or the "recording list" button 270 to select an EPG 252, a play list 269, or a recording list 271, respectively. The user selection component 512 may be used to perform a variety of other functions, as will be described below.

The remote control 106 may also include a formatting component 516 configured to format the list 511 in a manner suitable for display and navigation by a user. In the case of an EPG 252, the list may be organized, as previously described, in a grid or columnar format including separate axes corresponding to channels 254 and timeslots 256, and a plurality of selectable elements corresponding to television programs 258.

A searching component 518 may also be provided so that a user can search for a specific television program 258. The searching component 518 may receive keywords 520 from the user via the user selection component 512. The keywords 520 may include one or more words from the title, program description, credits, or other characteristics of the television program 258 sought by the user. If desired, the searching component 518 may also receive a selection of one or more fields (i.e., title, program description, program classification, etc.) in which the keywords 520 are to be found. The searching component 518 may then search for the keywords 520 in the list 511 of television programs 258, and may provide a list 522 of search results to the formatting component 516 for subsequent display.

In an alternative embodiment, searching may be carried out by the DVR 102 instead of by the remote control 106. More specifically, the user controls 420 of the remote 106 may simply be used to obtain the keywords 520, which may be transmitted to the DVR 102 for processing by the CPU 312 of the DVR 102.

All or part of the list 511 of television programs 258 or the list 522 of search results may be displayed on the screen 250 via a display component 530. The display component 530 may be configured to permit a user to easily change how the list 511 is displayed.

In one embodiment, the user selection component 512 allows the user to select a television program 258 from the list 511 or the list 522 using the buttons 208, 210, 212, 214, 264, 266 shown in FIG. 2. More specifically, the navigation buttons 208, 210, 212, 214 may be used to highlight or otherwise designate one of the television programs 258 of the list 511 or the list 522, and the buttons 264, 266 may be used to enter the selection and choose an action to be performed with the selected program. Thus, a selection of a television program and action 532, or selection 532, is obtained.

The remote control 106 may also have a parameter modification component 534 configured to permit a user to modify his or her selection. The parameter modification component 534 may operate in conjunction with the user selection component 512. More specifically, a user may choose to modify the recording and/or storage parameters of the selection 532.

Recording and storage parameters may include characteristics such as the channel to be recorded, the starting and ending times of the recording, the recording quality (e.g., compression level, screen format, etc.), the classification of the recording (e.g., action, comedy, favorites, Harrison Ford movies, etc.), and any other parameters relevant to the recording and storage of the television program. The parameter modification component 534 may include the CPU 416 of the remote control 106 and/or the CPU 312 of the DVR 102.

The selection 532 may be transmitted by a transmission component 536 to a reception component 540 within the DVR 102. The transmission component 536 and the reception component 540 may include the wireless transmitter 202 of the remote control 106 and the wireless receiver 204 of the DVR 102, respectively. After the selection 532 is received, the DVR 102 may initiate several different actions, depending on the selection 532.

If the selection 532 is a current television program (i.e., television program being broadcast at the time the selection 532 is received) to be played 542, the DVR 102 may utilize a television program reception component 560 to receive the television program 258 of the selection 532. The television program 258 may then be displayed on the TV 104 by a display component 564.

The television program reception component 560 may operate in conjunction with a program list reception component 566 configured to receive the list 511 of television programs 258 and optionally, additional programming information, from the network 101. The program list 511 may be transmitted to the remote control 106 by a program list transmission component 568 of the DVR 102. The program list 511 and the television programs 258 may be received from the network 101 in an integrated form, and may be separated by the DVR 102.

If the selection 532 is a recorded television program 258 to be played 544, the DVR 102 may initiate retrieval of the television program 258 of the selection 532 through the use of a retrieval component 570. The retrieval component 570 may obtain the television program 258 of the selection 532 from a storage 572 component within the DVR 102. The television program 258 corresponding to the selection 532 may then be routed to the display component 564 for display on the TV 104.

If the selection 532 is a current television program 258 to be recorded 546, the DVR 102 may simply initiate immediate recording of the television program 258 through the use of a recording component 580. The recording component 580 may receive the selected television program 258 and route the television program 258 to the storage 572. If desired, the recording component 580 may convert the television program 258 to a format more suitable for storage.

Such conversion may involve various compression schemes (e.g., MPEG) to decrease the amount of storage space required to store the television program 258. The compression scheme used may be subject to user selection through the use of the parameter modification component 534, as described previously.

If the selection 532 is a future television program 258 to be recorded 548, the DVR 102 may utilize a scheduling component 582 to schedule the recording to start and stop at the starting and stopping times of the television program 258 of the selection 532. The scheduling component 582 may thus maintain an array, linked list, or similar data structure containing information such as the names of television programs 258 to be recorded, the starting and stopping times of the television programs 258, the channels from which the television programs 258 are to be received, and the like.

A timekeeping component 584 may maintain the current date and time, and may operate in conjunction with the scheduling component 582 to begin and end recording of television programs 258 at the appropriate times. The timekeeping component 584 may include a system clock (not shown) of the DVR 102 or the like. In the alternative, the current time may be received periodically from the network 101, to ensure that the time used by the DVR 102 is accurate and synchronized with the broadcasting times of the television programs 258.

When activated by the scheduling component 582, the recording component 580 may initiate recording of the television program 258 of the selection 532 in much the same manner as described above, in connection with a current television program to be recorded 546. The television program 258 of the selection 532 may be stored in the storage 572 for subsequent retrieval by the retrieval component 570 and playback by the display component 564.

Figure 6:
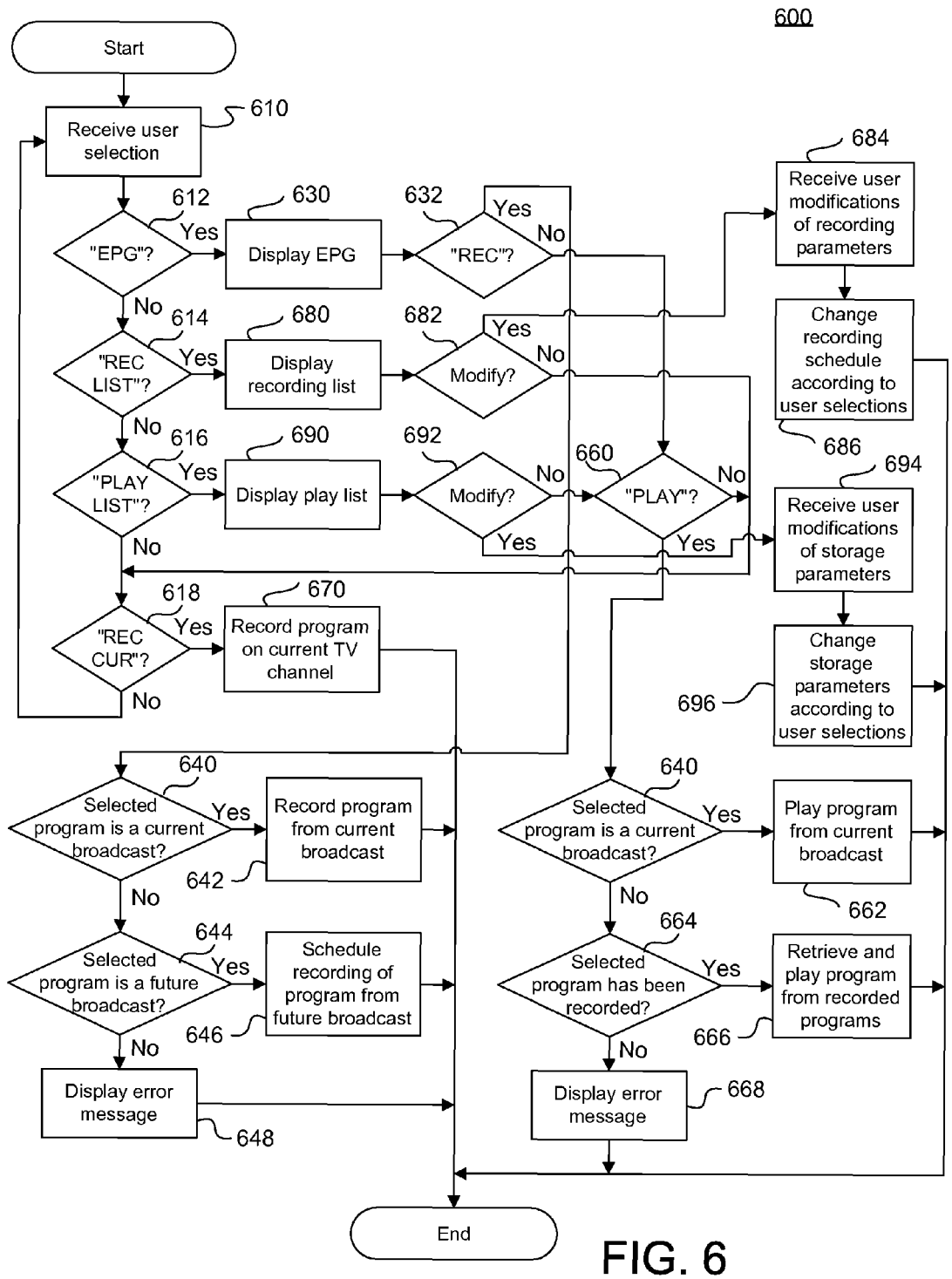
FIG. 6 is a flowchart of a method for digital recording and playback using a remote control with an integrated display screen.

Referring to FIG. 6, there is shown a flowchart of one possible method 600 controlling a DVR 102 using a remote control 106 with an integrated display screen 250. Initially, the remote control 106 may receive 610 a user selection, which may include receiving the selection 532 of FIG. 5. The remote control 106 may then carry out a series of queries 612, 614, 616, 618 to determine the nature of the selection 532 and act accordingly.

The remote control 106 may determine 612 whether or not the user has pressed the "EPG" button 216. If the user has pressed the "EPG" button 216, the remote control 106 may then display 630 the list 511 of television programs 258 in the form of an EPG 252, as previously described. A user may freely navigate through the EPG 252, and may highlight or otherwise mark one of the television programs 258 of the EPG 252, as described above.

Next, the remote control 106 may determine 632 whether the "record selection" button 266 has been pressed. If the "record selection" button 266 has been pressed, the remote control 106 or the DVR 102 may then determine 640 whether the television program 258 of the selection 532 is currently being broadcast. If so, the DVR 102 may immediately begin to record 642 the television program 258 of the selection 532.

If the television program 258 of the selection 532 is not currently being broadcast, the remote control 106 or the DVR 102 may determine 644 whether the television program 258 of the selection 532 is to be broadcast in the future. If so, the DVR 102 may schedule 646 recording of the television program 258 at the appropriate future time. If the television program 258 of the selection 532 is not a future broadcast, it must have already ended. Thus, the remote control 106 or the DVR 102 may display 648 an error message to indicate that the television program 258 is no longer available for recording.

If the "record selection" button 266 has not been pressed, the remote control 106 may determine 660 whether the "play selection" button 264 has been pressed. If the "play selection" button 264 has been pressed, the remote control 106 or the DVR 102 may then determine 640 whether the television program 258 of the selection 532 is currently being broadcast. If so, the DVR 102 may immediately begin to play 662 the television program 258 of the selection 532 directly from the broadcast.

If the television program 258 of the selection 532 is not currently being broadcast, the remote control 106 or the DVR 102 may determine 664 whether the television program 258 of the selection 532 has been recorded by the DVR 102. If so, the DVR 102 may retrieve and play 666 the television program 258 from the storage 572 of the DVR 102. If the television program 258 of the selection 532 has not been recorded, it has already ended without being recorded by the DVR 102, or it is a future broadcast. Thus, the remote control 106 or the DVR 102 may display 668 an error message to indicate that the television program 258 is not presently available for playback.

If the "play selection" button 264 has not been pressed, the remote control 106 may then determine 618 whether the "record current" button 262 has been pressed. If the "record current" button 262 has been pressed, the remote control 106 and the DVR 102 need not conduct further queries; rather, the DVR 102 may simply begin to record 670 the television program on the channel currently being viewed on the TV 104. Indeed, the "record current" button 262 may be pressed at any time during the method 600 since recording 670 the current television program is not dependent upon the existence of or navigation through the EPG 252 of television programs. If desired, the DVR 102 may be configured to automatically stop recording at the end of the television program 258 currently being viewed.

If the "EPG" button 216 has not been pressed, the remote control 106 may determine 614 whether the "record list" button 270 has been pushed. If the "record list" button 270 has been pushed, the remote control 106 may display 680 the list 511 of television programs 258 in the form of a recording list 271 that includes only programs that have been scheduled for recording by the DVR 102. A user may navigate through a recording list 271 and highlight or otherwise mark a television program 258 as described above in connection with the EPG 252.

The remote control 106 may then determine 682 whether the user has selected to modify recording parameters of the television program 258 that has been highlighted or otherwise marked. A selection to modify may be made using a dedicated button (not shown), or through the use of an on-screen menu presented in conjunction with the recording list 271.

If the user has selected to modify the recording parameters, the remote control 106 may receive 684 the user modifications of the recording parameters of the television program 258 that has been selected, and may then change 686 the recording schedule maintained by the scheduling component 582 to incorporate the modifications. As mentioned above, the recording parameters may include the channel to be recorded, the recording times, the recording quality, and the like. If the user has not selected to modify the recording parameters, the remote control 106 may determine 618 whether the user has pushed the "record current" button 262, and may operate as described above.

If the user has not pressed the "EPG" button 216 or the "record list" button 270, the remote control 106 may determine 616 whether the user has pressed the "play list" button 268. If so, the remote control 106 may display 690 a list 511 of television programs 258 in the form of a play list 269 that contains only television programs 258 that have been recorded by the DVR 102. A user may navigate through a play list 269 and highlight or otherwise mark a television program 258 in much the same manner as with the EPG 252 or the recording list 271.

The remote control 106 may then determine 692 whether the user has selected to modify recording parameters of the television program 258 that has been highlighted or otherwise marked. A selection to modify may be made using a dedicated button (not shown), or through the use of an on-screen menu presented in conjunction with the play list. Since the programs of the play list have already been recorded, only storage parameters, such as recording quality, save/delete status, and classification, may be altered.

If the user has selected to modify the recording parameters, the remote control 106 may receive 694 the user modifications of the storage parameters of the television program 258 that has been selected, and may then change 696 the storage parameters of the selected television program 258 within the storage 572 to incorporate the modifications.

If the user has not selected to modify the storage parameters, the remote control 106 may then determine 660 whether the user has pressed the "play selection" button 264. If so, the remote control 106 or the DVR 102 may carry out the playback steps and queries 640, 662, 664, 666, 668 in much the same manner as with the EPG 252. If not, the remote control 106 may determine 618 whether the "record current" button 262 has been pressed, and carry on the following steps as described above.

If none of the determinations 612, 614, 616, 618 are affirmative (i.e., the user has not pressed any of the buttons 216, 270, 268, 262), the remote control 106 may simply receive 610 another user selection until a proper selection has been received. Various additional controls and/or commands may be utilized to navigate through menus and lists presented by the remote control 106, as known in the art. FIG. 6 depicts only one possible user interface structure for the system 200.

Based on the foregoing, the present invention offers numerous advantages not available in conventional approaches. For example, the present invention allows the user to easily control the operation of the DVR 102 independent of the TV 104; a user may even receive programming information and make recording decisions without turning on the TV 104. The remote control 106 may permit a user to perform a variety of recording, playback, and modification functions. The user may also easily search for and obtain information regarding desired television programs by interacting only with the remote control 106.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A remote control device for a digital video recorder, the remote control device comprising:
   a wireless receiver operable to receive a play list from the digital video recorder, the play list comprising television programs previously recorded by the digital video recorder;
   a display screen integrated into the remote control device operable to display the play list to a user, the display screen comprising a touch screen interface operable to receive input by sensing user contact with the display screen;
   a plurality of user controls operable to control the digital video recorder, at least one user control for receiving a selection of a television program from the play list displayed on the integrated display screen; and
   a wireless transmitter operable to transmit an indication of the selected television program to initiate playback of the selected television program.

2. The remote control device of claim 1, wherein the wireless receiver is further operable to receive an electronic program guide comprising a plurality of upcoming television programs and the display screen is operable to display the electronic program guide.

3. The remote control device of claim 2, wherein the plurality of user controls comprise a control operable to instruct the digital video recorder to record a currently selected program from the plurality of upcoming television programs displayed within the electronic program guide, and the wireless transmitter is operable to transmit an indication of the currently selected program to schedule recording of the currently selected program.

4. The remote control device of claim 2, wherein the electronic program guide further includes a plurality of currently available television programs, and the plurality of user controls comprise a control operable to instruct the digital video recorder to record a currently selected program from the plurality of currently available television programs, and the wireless transmitter is operable to transmit an indication of the currently selected program to initiate recording of the currently selected program.

5. The remote control device of claim 1, wherein the wireless receiver is further operable to receive a recording list including one or more television programs scheduled to be recorded by the digital video recorder; and
   wherein the display screen is to display the recording list to the user.

6. The remote control device of claim 1, wherein at least one user control is configured to be used to navigate an electronic program guide comprising a list of television programs, and wherein at least one control is configured for initiating transmission of a selected television program to a set top box comprising the digital video recorder.

7. The remote control device of claim 1, wherein the wireless transmitter and wireless receiver operate according to one of an Institute of Electronics and Electrical Engineers (IEEE) 802.11 standard, a Bluetooth™ standard, or an infrared data association (IrDA) standard.

8. The remote control device of claim 1, wherein the wireless transmitter and wireless receiver comprise a wireless transceiver operable to communicate data over radio frequency.

9. The remote control device of claim 8, wherein the wireless transceiver is operable to send and receive wireless signals to and from an intermediate device operable to interface with the digital video recorder via a network interface.

10. A system for digital video recording and playback comprising:
    a digital video recorder comprising:
       a network interface operable to transmit a play list comprising indications of television programs to a wireless control device for display thereon, and to receive a selection of a television program displayed in the play list on the wireless control device; and
       a display subsystem operable to selectively process the received selection for display on display device; and
    a remote control device for the digital video recorder comprising:
       a wireless receiver operable to receive the play list from the digital video recorder;
       an integrated display screen for displaying the play list to a user;
       a plurality of user controls for controlling the digital video recorder, at least one user control for enabling selection by the user of a television program from the play list; and
       a wireless transmitter for transmitting an indication of the selected television program to the digital video recorder to initiate display of the selected television program.

11. The system of claim 10, wherein the digital video recorder further comprises:
    an encoder for digitally encoding a television program in a compressed format;
    a mass storage device for storing the encoded television program and electronic program guide data associated with the television program;
    a decoder for decoding a television program retrieved from the mass storage device; and
    wherein the display subsystem comprises a display controller operable to provide the decoded television program for display on an external device.

12. The system of claim 10, wherein the digital video recorder is integrated with a set top box (STB) for an interactive television system.

13. The system of claim 10, wherein the integrated display screen is further configured to display the play list as an electronic program guide (EPG) configured as a grid having a plurality of rows and columns corresponding to channels and timeslots, the rows and columns forming a plurality of selectable elements corresponding to television programs.

14. The system of claim 13, wherein at least one user control is configured to receive a user command to record a selected television program from the play list, and wherein the wireless transmitter is configured to transmit the user command to the digital video recorder.

15. The system of claim 10, wherein the integrated display screen is further configured to display a recording list including television programs scheduled to be recorded by the digital video recorder.

16. The system of claim 10, wherein at least one user control is configured to receive a user command to play back a previously recorded television program, and wherein the wireless transmitter is configured to transmit the user command.

* * * * *